(12) United States Patent
Goto et al.

(10) Patent No.: US 9,744,901 B2
(45) Date of Patent: Aug. 29, 2017

(54) VEHICLE-MOUNTED APPARATUS

(71) Applicant: DENSO CORPORATION, Kariya, Aichi-pref. (JP)

(72) Inventors: Hirotaka Goto, Nagoya (JP); Hiroaki Tanaka, Okazaki (JP); Katsuyoshi Nishii, Okazaki (JP); Toshiaki Nakayama, Miyoshi (JP); Shohei Morikawa, Ichinomiya (JP); Yasutsugu Nagatomi, Chiryu (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/627,278

(22) Filed: Feb. 20, 2015

(65) Prior Publication Data
US 2015/0258928 A1 Sep. 17, 2015

(30) Foreign Application Priority Data

Mar. 14, 2014 (JP) .................................. 2014-52055

(51) Int. Cl.
| | |
|---|---|
| B60Q 1/08 | (2006.01) |
| B60Q 1/00 | (2006.01) |
| B60Q 1/24 | (2006.01) |
| B60Q 1/50 | (2006.01) |
| B60Q 1/52 | (2006.01) |

(52) U.S. Cl.
CPC ........... *B60Q 1/085* (2013.01); *B60Q 1/0035* (2013.01); *B60Q 1/24* (2013.01); *B60Q 1/50* (2013.01); *B60Q 1/525* (2013.01); *B60Q 2300/45* (2013.01)

(58) Field of Classification Search
None
See application file for complete search history.

(56) References Cited

U.S. PATENT DOCUMENTS

| | | | | |
|---|---|---|---|---|
| 6,281,806 B1* | 8/2001 | Smith | ................... | B60Q 1/085 340/436 |
| 2005/0275562 A1* | 12/2005 | Watanabe | ............. | B60Q 1/085 340/933 |
| 2007/0102214 A1* | 5/2007 | Wittorf | ................... | B60Q 1/50 180/167 |

(Continued)

FOREIGN PATENT DOCUMENTS

| | | |
|---|---|---|
| JP | 2006-044359 A | 2/2006 |
| JP | 2006-163637 A | 6/2006 |

(Continued)

*Primary Examiner* — Rami Khatib
*Assistant Examiner* — Nicholas K Wiltey
(74) *Attorney, Agent, or Firm* — Posz Law Group, PLC

(57) ABSTRACT

An apparatus mountable on a vehicle includes a movable device, a sensor, and a drive controller. The movable device is mountable on the vehicle so that a person around the vehicle sees the movable device. The movable device has at least one light emitter and is capable of rotating around an imaginary line extending in a height direction of the vehicle. The sensor detects a positional relationship between the vehicle and the person. The drive controller rotates the movable device toward the person based on the positional relationship detected by the sensor. The number of the light emitters shining steadily is increased after the drive controller rotates the movable device toward the person.

15 Claims, 12 Drawing Sheets

(56) References Cited

U.S. PATENT DOCUMENTS

| | | | |
|---|---|---|---|
| 2008/0175012 A1* | 7/2008 | Shimaoka | B60Q 1/085 362/464 |
| 2011/0068910 A1 | 3/2011 | Iwai et al. | |
| 2012/0323439 A1* | 12/2012 | Inakazu | B60Q 5/008 701/36 |
| 2013/0329440 A1 | 12/2013 | Tsutsumi et al. | |
| 2014/0185307 A1* | 7/2014 | Lee | F21S 48/1747 362/465 |
| 2015/0138817 A1* | 5/2015 | Salter | F21S 48/214 362/510 |

FOREIGN PATENT DOCUMENTS

| | | |
|---|---|---|
| JP | 2007-38878 A | 2/2007 |
| JP | 2007-290548 A | 11/2007 |
| JP | 2011-084106 A | 4/2011 |

\* cited by examiner

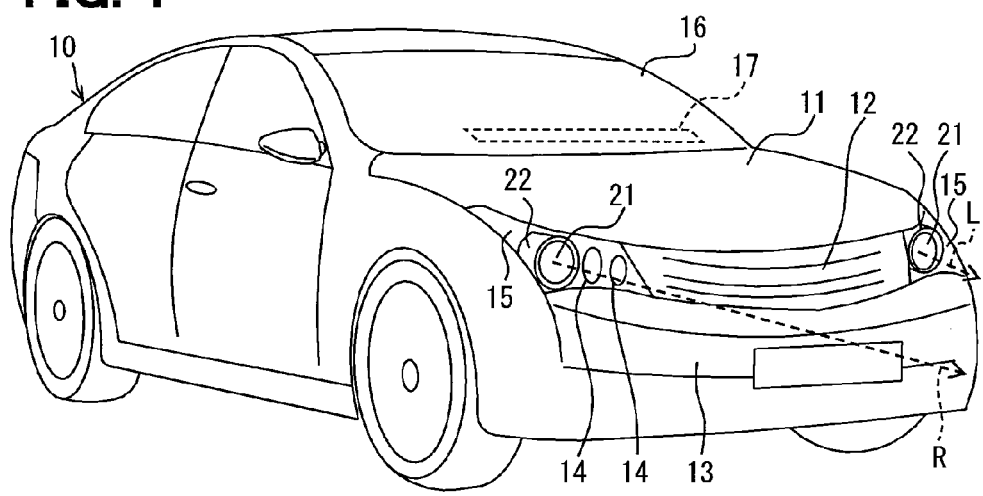
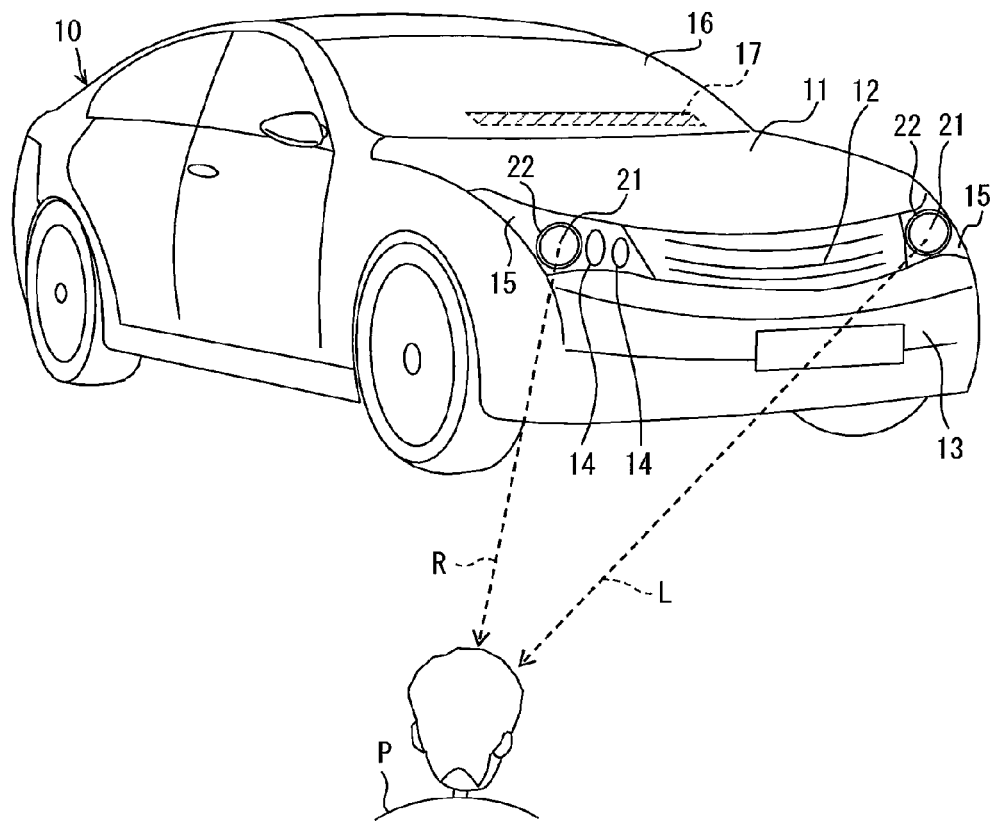

OFF

SOME ON

ALL ON

VEHICLE-MOUNTED APPARATUS

CROSS REFERENCE TO RELATED APPLICATION

This application is based on Japanese Patent Application No. 2014-52055 filed on Mar. 14, 2014, the disclosure of which is incorporated herein by reference.

FIELD

The present disclosure relates to an apparatus mountable on a vehicle to give a feeling of security to a person around the vehicle.

BACKGROUND

Techniques to give a notification to a pedestrian around a vehicle have been proposed lately. For example, JP 2006-163637A discloses that a possibility of collision between a pedestrian and a vehicle is forecasted and that when the possibility is high, the pedestrian is notified of the possibility.

However, from a pedestrian perspective, a pedestrian is given a feeling of insecurity if the pedestrian does not know whether a vehicle approaching the pedestrian is aware of the presence of the pedestrian. Even if the vehicle outputs a notification to notify that the vehicle is approaching, the pedestrian will still retain the feeling of insecurity because it is unclear whether the notification is directed to the pedestrian or another pedestrian.

In particular, during the nighttime, since a pedestrian cannot clearly see the face and gestures of a driver of a vehicle, a feeling of insecurity given to the pedestrian may be increased. Further, in a case of an autonomous vehicle which has been increasingly developed lately, since a driver may be not in the vehicle, the feeling of insecurity may be much increased. This type of feeling of insecurity will be given to not only pedestrians but also drivers of other vehicles including bicycles and cars around the vehicle.

SUMMARY

In view of the above, it is an object of the present disclosure to provide an apparatus mountable on a vehicle to reduce a feeling of insecurity given to pedestrians and drivers of other vehicles around the vehicle.

According to an aspect of the present disclosure, an apparatus mountable on a vehicle includes a movable device, a sensor, and a drive controller. The movable device is mountable on the vehicle so that a person around the vehicle can see the movable device. The movable device has at least one light emitter and is capable of rotating around an imaginary line extending in a height direction of the vehicle. The sensor detects a positional relationship between the vehicle and the person. The drive controller rotates the movable device toward the person based on the positional relationship detected by the sensor. The number of the light emitters shining steadily is increased after the drive controller rotates the movable device toward the person.

In this aspect, the movable device rotates based on the positional relationship detected by the sensor toward the person around the vehicle. Thus, the person notices that the vehicle is already aware of the person. Therefore, a feeling of insecurity, such as not knowing whether or not the vehicle is aware of the person, given to the person can be reduced.

According to another aspect of the present disclosure, an apparatus mountable on a vehicle includes an indicator, a sensor, and a controller. The indicator is mountable on the vehicle so that a person around the vehicle sees the indicator. The indicator displays a specific light emitter shining in a predetermined manner so that the person can see the specific light emitter moving in a lateral direction of the vehicle. The sensor detects a positional relationship between the vehicle and the person. The controller controls the indicator so that the specific light emitter stops moving at a position on a near side to the person.

In this aspect, the indicator displays the specific light emitter so that the specific light emitter can stop moving at the position on the near side to the person around the vehicle. Thus, the person notices that the vehicle is already aware of the person. Therefore, a feeling of insecurity, such as not knowing whether or not the vehicle is aware of the person, given to the person can be reduced.

BRIEF DESCRIPTION OF THE DRAWINGS

The above and other objects, features and advantages of the present disclosure will become more apparent from the following detailed description made with reference to the accompanying drawings. In the drawings:

FIG. 1 is a perspective view illustrating where a movable device of a vehicle-mounted apparatus according to a first embodiment of the present disclosure is mounted on a vehicle;

FIG. 2 is a perspective view illustrating how the movable device according to the first embodiment operates;

DETAILED DESCRIPTION

Figure 3:
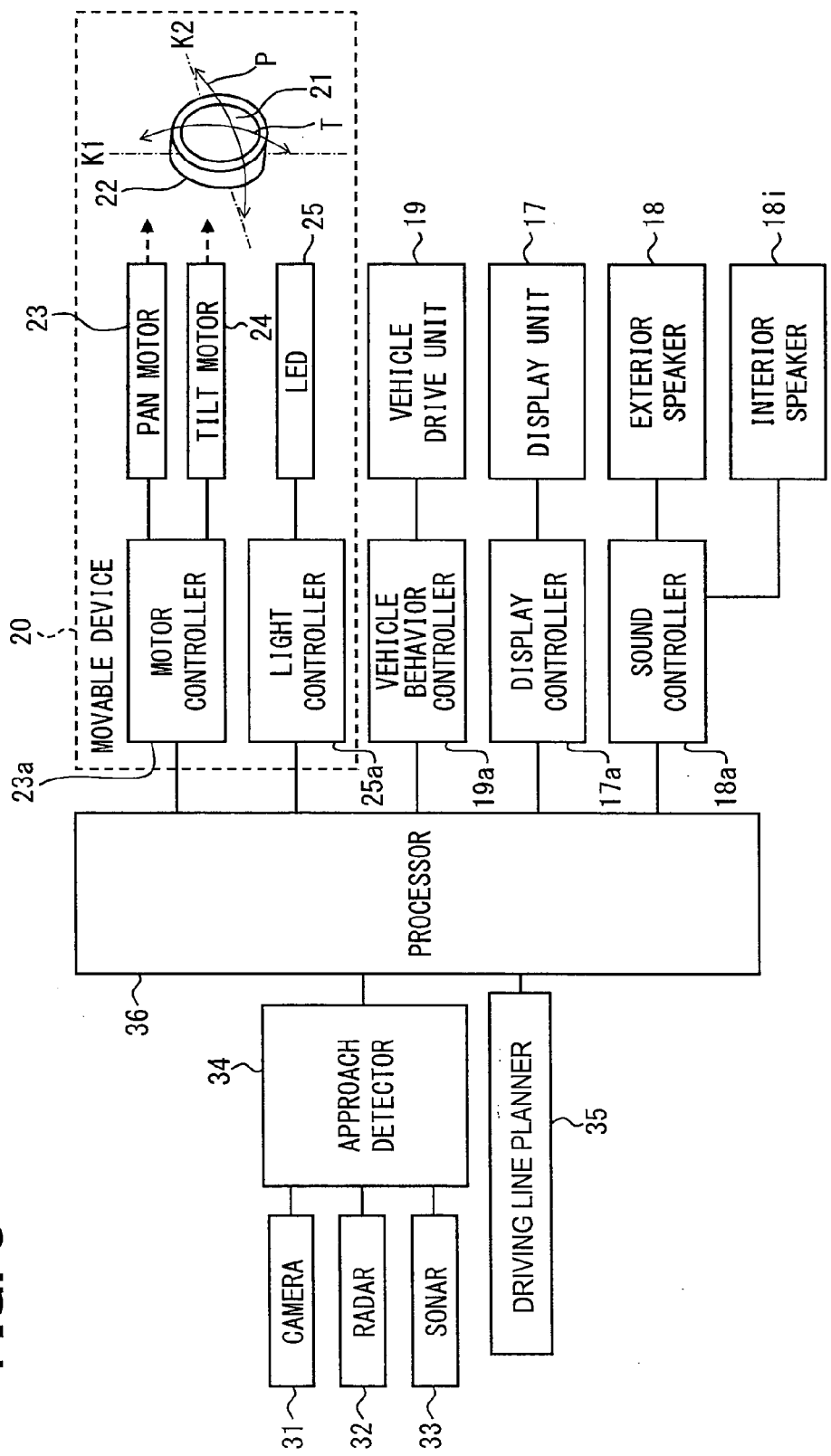
FIG. 3 is a block diagram of the movable device according to the first embodiment.

Embodiments of the present disclosure are described below with reference to the drawings in which like characters of reference indicate the same or equivalent parts.

First Embodiment

A vehicle 10 shown in FIG. 1 has an automatic driving function. For example, the automatic driving function can achieve automatic control of driving and braking forces, automatic control of steering, and automatic control of switching between back and forward movements. A driving mode of the vehicle 10 can be switched between an automatic mode and a manual mode. In the automatic mode, the vehicle 10 is automatically controlled and driven by the automatic controls. On the other hand, in the manual mode, the vehicle 10 is manually controlled and driven in response to an operation by a driver of the vehicle 10.

The vehicle 10 includes a hood 11, a front grille 12, a bumper 13, and headlights 14. The headlights 14 are covered with translucent outer covers 15 and located between right and left ends of the front grille 12 while being located between the hood 11 and the bumper 13. In an example shown in FIG. 1, each two headlights 14 are covered with one outer cover 15. A movable device 20 is placed in each outer cover 15 in addition to the headlights 14. As shown in FIG. 2, the movable device 20 rotates to face a person P around the vehicle 10. Examples of the person P can include a pedestrian, a driver of a bicycle, a driver of a motorcycle, and a driver of a car.

As shown in FIG. 3, the movable device 20 includes a light emitting diode (LED) 25 as a light source, a cover 21 for coveting the LED 25, and a housing 22 for holding the LED 25 and the cover 21. The housing 22 is mounted inside the outer cover 15 in such a way that allows the housing 22 to perform a pan action and a tilt action. When performing the pan action, the housing 22 rotates around an imaginary line K1 extending in a height direction of the vehicle 10. On the other hand, when performing the tilt action, the housing 22 rotates around an imaginary line K2 extending in a lateral (i.e., horizontal) direction of the vehicle 10.

The movable device 20 further includes a pan motor 23 and a tilt motor 24. The pan motor 23 allows each housing 22 to perform the pan action, and the tilt motor 24 allows each housing 22 to perform the tilt action. When each housing 22 performs the pan action with the pan motor 23, optical axes R and L of the LEDs 25 move in the lateral direction. On the other hand, when each housing 22 performs the tilt action with the tilt motor 24, the optical axes R and L of the LEDs 25 move in the height direction. The movable device 20 further includes a motor controller 23a (i.e., drive controller) and a light controller 25a. The motor controller 23a controls and drives the pan motor 23 and the tilt motor 24. The light controller 25a controls and drives the LEDs 25.

The vehicle 10 is equipped with a camera 31, a radar device 32, and a sonar device 33. The camera 31 captures a video image of an area around the vehicle 10. The radar device 32 emits a radio wave toward an object (e.g., person P) around the vehicle 10, receives an echo of the radio wave reflected by the object, and detects a positional relation between the vehicle 10 and the object based on the echo of the radio wave. Specifically, the radar device 32 detects a distance between the vehicle 10 and the object and also detects a direction of the object with respect to the vehicle 10. The sonar device 33 emits a sound wave toward the object, receives an echo of the sound wave reflected by the object, and detects a positional relation between the vehicle 10 and the object based on the echo of the sound wave. Specifically, the sonar device 33 detects the distance between the vehicle 10 and the object and also detects the direction of the object with respect to the vehicle 10 based on the echo of the sound wave.

An approach detector 34 detects a person approaching the vehicle 10 based on information obtained by sensors including the camera 31, the radar device 32, and the sonar device 33. The approach detector 34 can be implemented by a microcomputer or the like. For example, the approach detector 34 detects whether a pedestrian or another vehicle is approaching the vehicle 10 based on the video image captured by the camera 31. Further, the approach detector 34 detects the distance between the vehicle 10 and the pedestrian or the other vehicle (hereinafter collectively referred to as the "approaching person") approaching the vehicle 10 based on detection results of the radar device 32 and the sonar device 33.

The vehicle 10 is equipped with a display unit 17 (i.e., notification device) and an exterior speaker 18 (i.e., notification device). As shown in FIG. 1, the display unit 17 is mounted on a front windshield 16 of the vehicle 10. In a non-display mode where the display unit 17 is not driven, the display unit 17 is transparent. When the display unit 17 is driven, a content displayed on the display unit 17 can be seen from outside the vehicle 10. Examples of the content displayed on the display unit 17 can include a message and a design. The exterior speaker 18 outputs various types of sounds including a warning sound and a voice sound.

The vehicle 10 is further equipped with a vehicle drive unit 19, a vehicle behavior controller 19a, and a driving line planner 35 to achieve the automatic driving function described above. Examples of the vehicle drive unit 19 can include a driving motor to run the vehicle 10, an actuator of a braking device, and an actuator of a steering device. The driving line planner 35 plans a driving line for the vehicle 10 based on map information and a position of the vehicle 10 measured by a global positioning system (GPS). A processor 36 outputs a command to the vehicle behavior controller 19a. The processor 36 can be implemented by a microcomputer or the like. The vehicle behavior controller 19a controls the vehicle 10 in accordance with the command so that the vehicle 10 can automatically travel along the driving line planned by the driving line planner 35. In this way, the automatic driving function is achieved.

When the approach detector 34 detects the approaching person, the processor 36 determines whether a possibility of collision between the approaching person and the vehicle 10 is equal to or greater than a predetermined percentage based on the driving line planned by the driving line planner 35 and running conditions of the vehicle 10. If the processor 36 determines that the collision possibility is equal to or greater than the predetermined percentage, the processor 36 outputs command signals to the movable device 20, a display controller 17a, a sound controller 18a, and the vehicle behavior controller 19a based on a positional relationship between the vehicle 10 and the approaching person.

For example, when the processor 36 causes the vehicle 10 to be automatically driven so that the right of way can be given to the approaching person, the processor 36 notifies the approaching person that the vehicle 10 has an intension of giving the right of way to the approaching person by outputting the following command signals: The processor 36 outputs to the vehicle behavior controller 19a a command signal for causing the vehicle behavior controller 19a to move the vehicle 10 back by a predetermined distance (e.g., a few centimeters). The processor 36 outputs to the sound controller 18a a command signal for causing the sound controller 18a to cause the exterior speaker 18 to output an idling sound instead of a running sound as a fake engine sound, to stop outputting the fake engine sound, or to output a voice message "GO AHEAD" instead of the fake engine sound. The processor 36 outputs to the display controller 17a a command signal for causing the display controller 17a to cause the display unit 17 to display a text message "GO AHEAD" or a design, such as an arrow, corresponding to the text message.

For example, when the processor 36 causes the vehicle 10 to be automatically driven based on the premise that the vehicle 10 is given the right of way by the approaching person, the processor 36 notifies the approaching person that the vehicle 10 would like the approaching person to give the right of way to the vehicle 10 by outputting the following command signals: The processor 36 outputs to the vehicle behavior controller 19a a command signal for causing the vehicle behavior controller 19a to move the vehicle 10 forward by a predetermined distance (e.g., a few centimeters). The processor 36 outputs to the sound controller 18a a command signal for causing the sound controller 18a to cause the exterior speaker 18 to output the running sound instead of the idling sound as the fake engine sound or to output a voice message "START MOVING" instead of the fake engine sound. The processor 36 outputs to the display controller 17a a command signal for causing the display controller 17a to cause the display unit 17 to display a text message "START MOVING" or a design, such as an arrow, corresponding to the text message.

It is preferable that the interior speaker 18i should output the same voice message as the exterior speaker 18 outputs. In such an approach, occupants of the vehicle 10 can be notified of the content of the voice message outputted from the exterior speaker 18.

Figure 4:
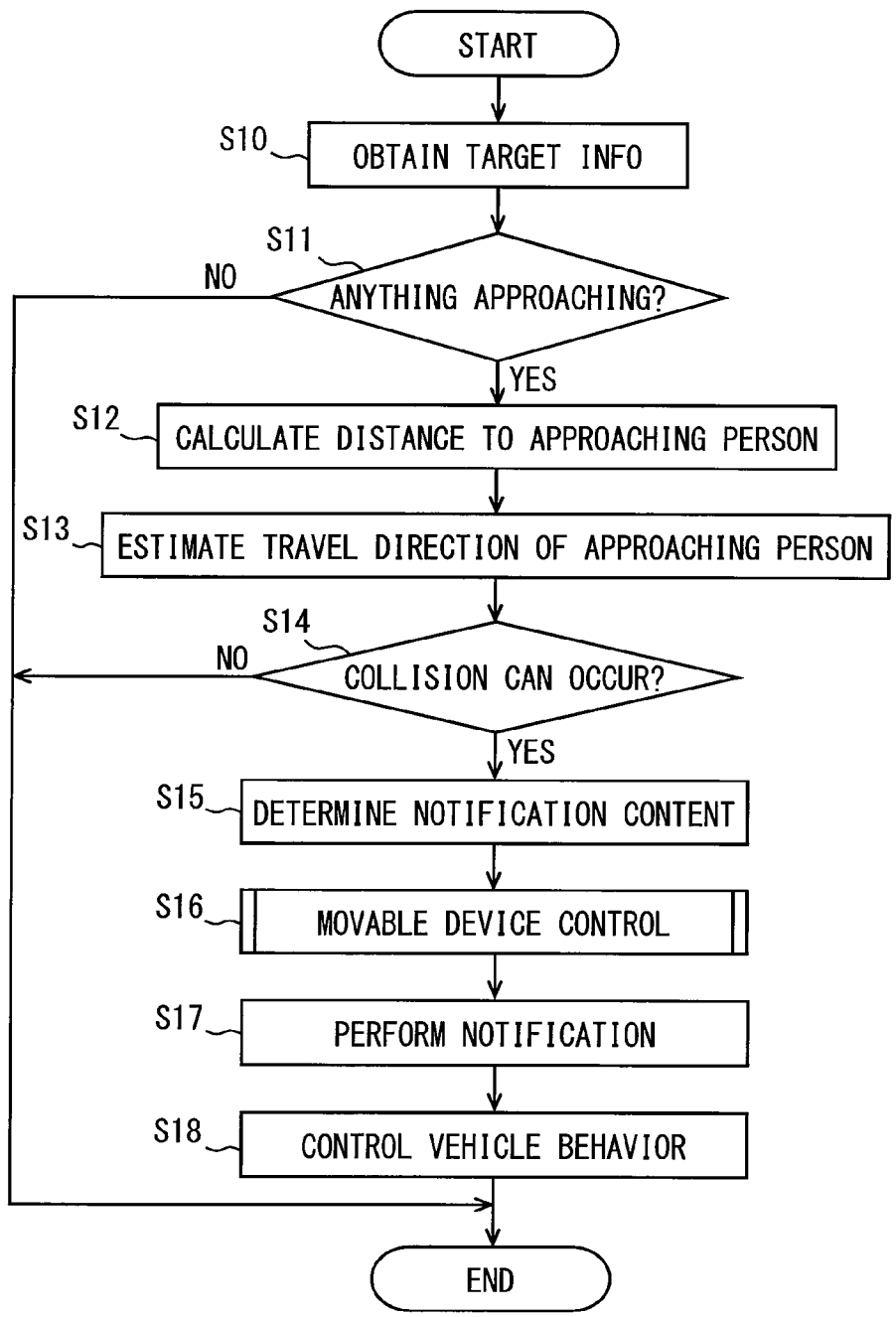
FIG. 4 is a flowchart of a main control process according to the first embodiment.

FIG. 4 is a flowchart of a main control process performed by a microcomputer which implements the approach detector 34 and the processor 36. The main control process is repeatedly performed at a predetermined interval in accordance with programs. This main control process is used to detect the approaching person. Further, when the approaching person is detected, the main control process automatically controls the vehicle 10 while driving the movable device 20.

Firstly, the main control process starts at S10, where the detection results of the radar device 32 and the sonar device 33 are obtained while the image captured by the camera 31 is obtained. Then, at S11, the image obtained at S10 is analyzed, and it is determined based on the analysis whether there is anything approaching the vehicle 10. That is, at S11, it is determined based on the analysis whether there is an approaching person including a pedestrian, a bicycle, and a car.

If it is determined that the approaching person exists corresponding to YES at S11, the main control process proceeds to S12, where the distance between the approaching person and the vehicle 10 is calculated based on the detection results obtained at S12. Then, at S13, a moving direction of the approaching person is estimated based on changes in the detection results obtained at S10. Then, at S14, it is determined whether the possibility of collision between the approaching person and the vehicle 10 is equal to or greater than the predetermined percentage based on the distance calculated at S12 and the moving direction estimated at S13.

If it is determined that the collision possibility is equal to or greater than the predetermined percentage corresponding to YES at S14, the main control process proceeds to S15 where a driving manner in which the vehicle 10 is automatically driven for the approaching person is determined. Further, at S15, a content of a notification given to the approaching person is determined according to the determined driving manner. For example, at S15, it is determined whether the vehicle 10 is automatically driven so that the vehicle 10 can give the right of way to the approaching person or so that the vehicle 10 can be given the right of way by the approaching person. Assuming that it is determined that the vehicle 10 is automatically driven so that the vehicle 10 can give the right of way to the approaching person, the content of the notification is determined at S15 so that the approaching person can be notified of a text message and/or a voice message "GO AHEAD".

Then, at S16, a movable device control process is performed as a subroutine of the main control process. In the movable device control process, the movable device 20 is driven based on the distance calculated at S12 and the moving direction estimated at S13. The movable device control process is described later. At S17 subsequent to S16, a notification procedure is performed so that the content of the notification determined at S15 can be displayed by the display unit 17 and outputted by the exterior speaker 18. It is noted that this notification procedure is performed after the pan action and the tilt action are completed as described later. Then, at S18, the vehicle drive unit 19 is automatically controlled based on the driving manner determined at S15 so that a behavior of the vehicle 10 can be controlled. For example, when the driving manner determined at S15 indicates that the vehicle 10 is automatically driven so that the vehicle 10 can give the right of way to the approaching person, the vehicle drive unit 19 is automatically controlled so that the vehicle 10 can move back a few centimeters and then stop.

Figure 5:
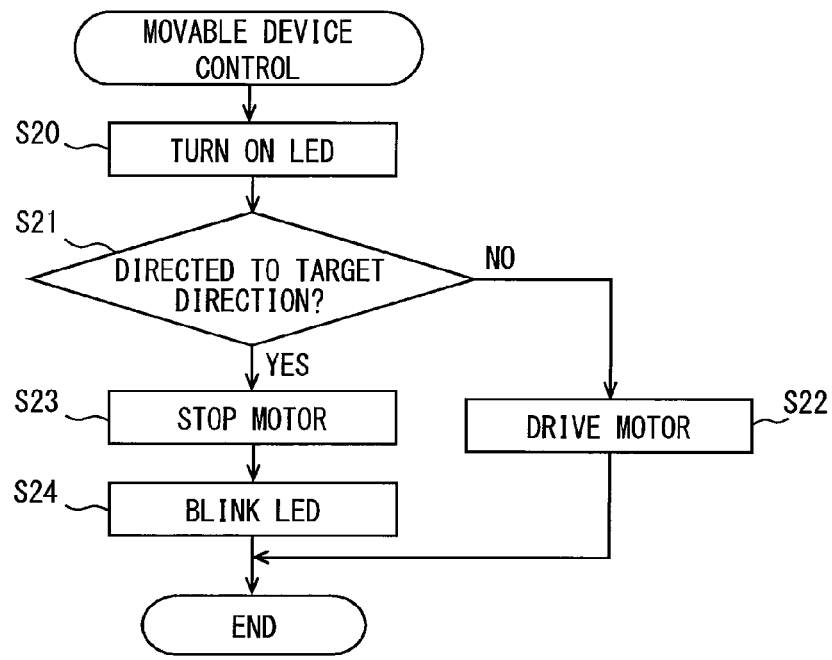
FIG. 5 is a flowchart of a movable device control process according to the first embodiment.

Next, the movable device control process performed at S16 is described with reference to FIG. 5. The movable device control process starts at S20 where the LEDs 25 held in the housings 22 are turned ON, so that the LEDs 25 shine steadily. Then, at S21, it is determined whether the optical axes R and L of the LEDs 25 are directed in target directions. If it is not determined that the optical axes R and L are directed in the target directions corresponding to NO at S21, the movable device control process proceeds to S22, where the pan motor 23 and the tilt motor 24 are driven so that the optical axes R and L can be directed in the target directions. It is noted that the target directions are calculated based on the image which is captured by the camera 31 and obtained at S10. For example, the image is analyzed so that a face of the approaching person captured in the image can be extracted, and the target directions are determined as directions toward the face of the approaching person.

In contrast, if it is determined that the optical axes R and L are directed in the target directions corresponding to YES at S21, the movable device control process proceeds to S23, where the pan motor 23 and the tilt motor 24 stop being driven. Then, at S24, the shining LEDs 25 are caused to blink.

In summary, when the movable device control process is performed, the movable device 20 operates as follows. Firstly, the LEDs 25 shine steadily. Next, the housings 22 perform the tilt action and the pan action with the LEDs 25 shining steadily so that the optical axes R and L of the LEDs 25 can be directed to the approaching person. Then, the LEDs 25 blink after both the tilt action and the pan action are completed.

Like the headlights 14, the movable devices 20 are separately mounted on right and left sides of the front portion of the vehicle 10. That is, two movable devices 20 are spaced from each other by a predetermined distance in the lateral direction. Specifically, the LED 25 and the housing 22 of one movable device 20 is located inside the outer cover 15 for the right headlight 14, and the LED 25 and the housing 22 of the other movable device 20 is located inside the outer cover 15 for the left headlight 14. The two movable devices 20 start to shine simultaneously, start to perform the tilt action and the pan action simultaneously, and start to blink simultaneously.

As described above, according to the first embodiment, the movable device 20 capable of performing the pan action is mounted on the vehicle 10 so that the person P around the vehicle 10 can see the movable device 20. The movable device 20 performs the pan action based on the detection results of the camera 31, the radar device 32, and the sonar device 33 so that the movable device 20 can pan toward the approaching person. Thus, the approaching person to whom the movable device 20 is directed notices that the vehicle 10 is already aware of the approaching person. Therefore, a feeling of insecurity, such as not knowing whether or not the vehicle 10 is aware of the approaching person, given to the approaching person can be reduced.

Further, according to the first embodiment, two movable devices 20 are spaced from each other by a predetermined distance in the horizon direction. Thus, the movable devices 20 give an impression of being a pair of eyes of an animal to the approaching person to whom the movable device 20 is directed. Therefore, the approaching person surely notices that the vehicle 10 is already aware of the approaching person. Accordingly, the feeling of insecurity given to the approaching person can be surely reduced.

Further, according to the first embodiment, each movable device 20 has the LED 25. The LED 25 is held in the housing 22 so that the optical axes R and L of the LEDs 25 can be directed to the approaching person when the housings 22 of the movable devices 20 pan toward the approaching person. In such an approach, the LEDs 25 move to face the approaching person while being shining. Thus, the approaching person more surely notices that the vehicle 10 is already aware of the approaching person. Accordingly, the feeling of insecurity given to the approaching person can be more surely reduced.

Further, according to the first embodiment, when the movable device 20 stops the pan action, the LED 25 is driven in a different manner than when the movable device 20 performs the pan action. Specifically, the LED 25 shines steadily when the movable device 20 performs the pan action, whereas the LED 25 blinks when the movable device 20 stops the pan action. Thus, from the approaching person perspective, the manner in which the LED 25 is driven changes when the movable device 20 pans toward the approaching person and stops the pan action at a position where the optical axes R and L are directed to the approaching person. Therefore, the approaching person more surely notices that the vehicle 10 is already aware of the approaching person. Accordingly, the feeling of insecurity given to the approaching person can be more surely reduced.

Further, according to the first embodiment, the exterior speaker 18 and the display unit 17 start notification of information to the approaching person when the movable device 20 stops the pan action or when a predetermined period of time elapses after the movable device 20 stops the pan action. Thus, from the approaching person perspective, the notification is started after the movable device 20 pans toward the approaching person and stops the pan action at the position where the optical axes R and L are directed to the approaching person. Thus, since the approaching person can feel that the notification is given to the approaching person, communication between the approaching person and the vehicle 10 can be promoted. Specifically, the approaching person easily know that the notification given to the approaching person indicates whether the vehicle 10 gives the right of way to the approaching person or the vehicle 10 would like the approaching person to give the right of way to the vehicle 10.

Further, according to the first embodiment, the movable device 20 is capable of rotating around the imaginary line K2 extending in the lateral direction. Specifically, the movable device 20 can perform the tilt action in addition to the pan action. Thus, the approaching person more surely notices that the vehicle 10 is already aware of the approaching person. Accordingly, the feeling of insecurity given to the approaching person can be more surely reduced.

Second Embodiment

In the first embodiment, the pan action and the tilt action are performed with the LED 25 shining steadily, and when the pan action and the tilt action are completed, the shining LED 25 is caused to blink. In contrast, according to a second embodiment, the pan action and the tilt action are performed with the LED 25 shining steadily, and when the pan action and the tilt action are completed, intensity (or brightness) of the shining LED 25 is increased.

Figure 6:
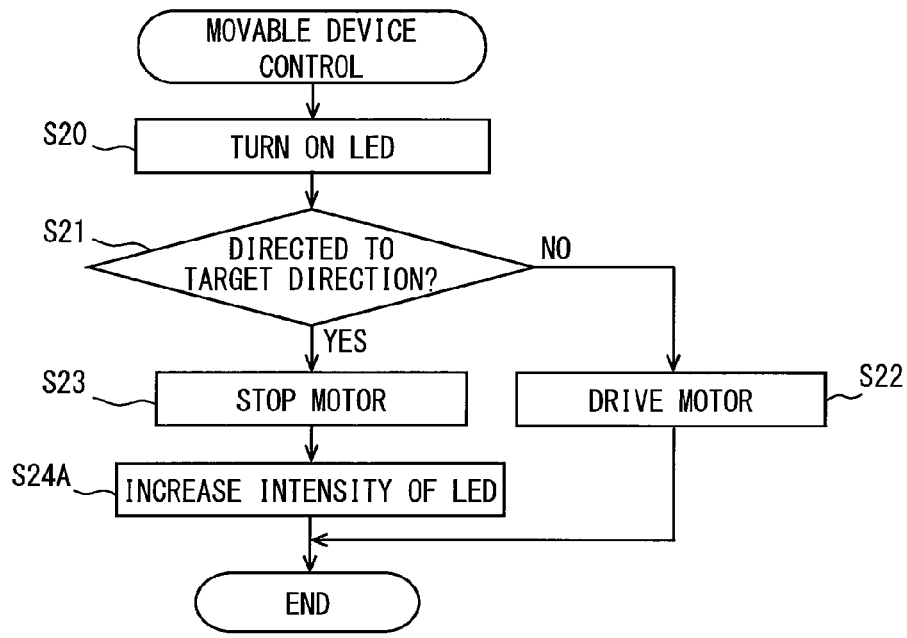
FIG. 6 is a flowchart of a movable device control process according to a second embodiment of the present disclosure.

Specifically, as shown in FIG. 6, after the LEDs 25 are turned ON at S20 so that the LEDs 25 can shine steadily, the pan motor 23 and the tilt motor 24 are driven at S22 so that the optical axes R and L of the LEDs 25 can be directed in the target directions, and then the pan motor 23 and the tilt motor 24 stop being driven at S23 when the optical axes R and L are directed in the target directions. Then, at S24A subsequent to S23, the intensity of each LED 25 is increased.

Thus, from the approaching person perspective, after the movable device 20 pans toward the approaching person and stops the pan action at a position where the optical axes R and L are directed to the approaching person, the intensities of the LEDs 25 are increased. Therefore, the approaching person more surely notices that the vehicle 10 is already aware of the approaching person. Accordingly, the feeling of insecurity given to the approaching person can be more surely reduced.

Third Embodiment

Figure 7:
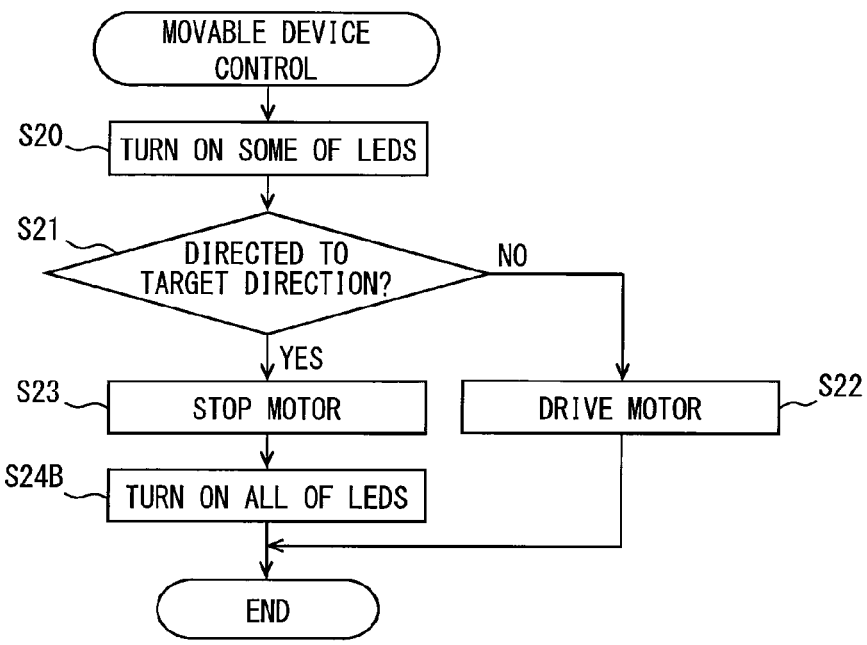
FIG. 7 is a flowchart of a movable device control process according to a third embodiment of the present disclosure.

In the first embodiment, each movable device 20 has one LED 25. In contrast, according to a third embodiment, each movable device 20 has multiple LEDs 25. In this case, when the movable device control process is performed at S16 in FIG. 4, some of LEDs 25 are turned ON at S20 in FIG. 7 so that they can shine steadily. In other words, at least one of the LEDs 25 is turned ON at S20 in FIG. 7. Then, the pan motor 23 and the tilt motor 24 are driven at S22 so that the optical axes R and L of the shining LEDs 25 can be directed in the target directions, and then the pan motor 23 and the tilt motor 24 stop being driven at S23 when the optical axes R and L are directed in the target directions. Then, at S24B subsequent to S23, the remaining LEDs 25 are turned ON so that all the LEDs 25 can shine steadily.

Figure 8:
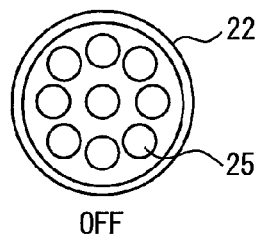
FIG. 8 is a front view of a housing when all of LEDs held in the housing are OFF according to the third embodiment.
Figure 9:
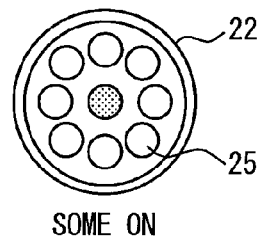
FIG. 9 is a front view of the housing when some of LEDs held in the housing are turned ON according to the third embodiment.
Figure 10:
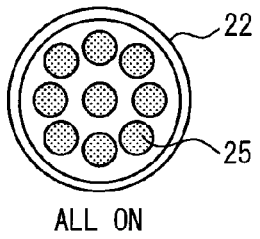
FIG. 10 is a front view of the housing when all of LEDs held in the housing are turned ON according to the third embodiment.

Thus, according to the third embodiment, when the possibility of collision between the vehicle 10 and the approaching person is equal to or greater than the predetermined percentage, a lighting state of the LEDs 25 change from a first state shown in FIG. 8 where all the LEDs 25 are kept OFF to a second state shown in FIG. 9 where some of the LEDs 25 are turned ON so that they can shine steadily. Then, after the movable device 20 pans toward the approaching person and stops the pan action at the position where the optical axes R and L are directed to the approaching person, the lighting state of the LEDs 25 change to a third state shown in FIG. 10 where the remaining LEDs 25 are turned ON so that all the LEDs 25 can shine steadily. Therefore, the approaching person more surely notices that the vehicle 10 is already aware of the approaching person. Accordingly, the feeling of insecurity given to the approaching person can be more surely reduced.

Fourth Embodiment

Figure 11:
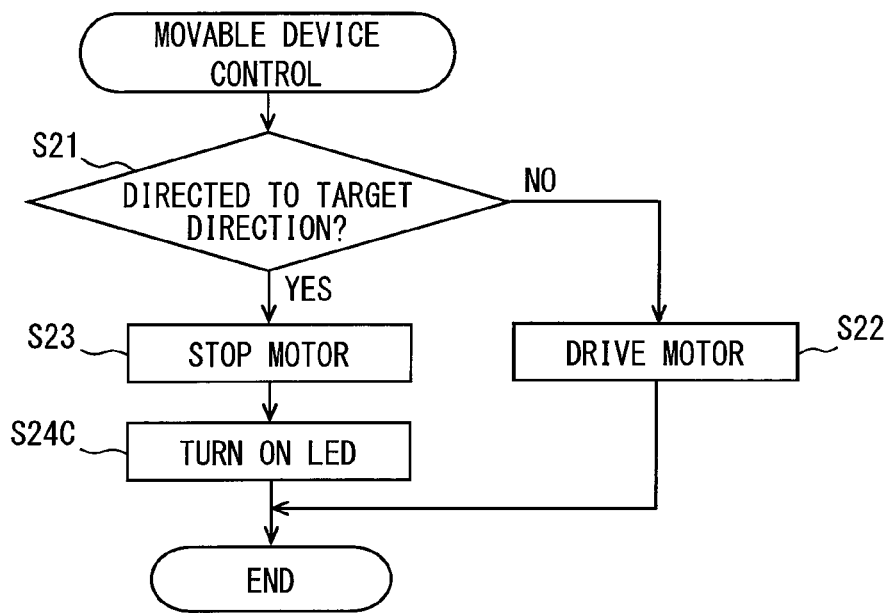
FIG. 11 is a flowchart of a movable device control process according to a fourth embodiment of the present disclosure.

In the preceding embodiments described above, the movable device 20 performs the pan action with the LED 25 shining steadily. In contrast, according to a fourth embodiment, the movable device 20 performs the pan action with the LED 25 OFF. That is, when the movable device control is performed at S16 in FIG. 4, S21, S22, and S23 in FIG. 11 are performed. Thus, the movable device 20 is driven with the LEDs 25 OFF so that the optical axes R and L of the LEDs 25 can be directed in the target directions. Then, when the optical axes R and L are directed in the target directions, the LEDs 25 are turned ON at S24C so that the LEDs 25 can shine steadily.

Thus, from the approaching person perspective, after the movable device 20 pans toward the approaching person and stops the pan action at a position where the optical axes R and L are directed to the approaching person, the LEDs 25 are turned ON so that the LEDs 25 can shine steadily. Therefore, the approaching person more surely notices that the vehicle 10 is already aware of the approaching person. Accordingly, the feeling of insecurity given to the approaching person can be more surely reduced.

Fifth Embodiment

Figure 15:
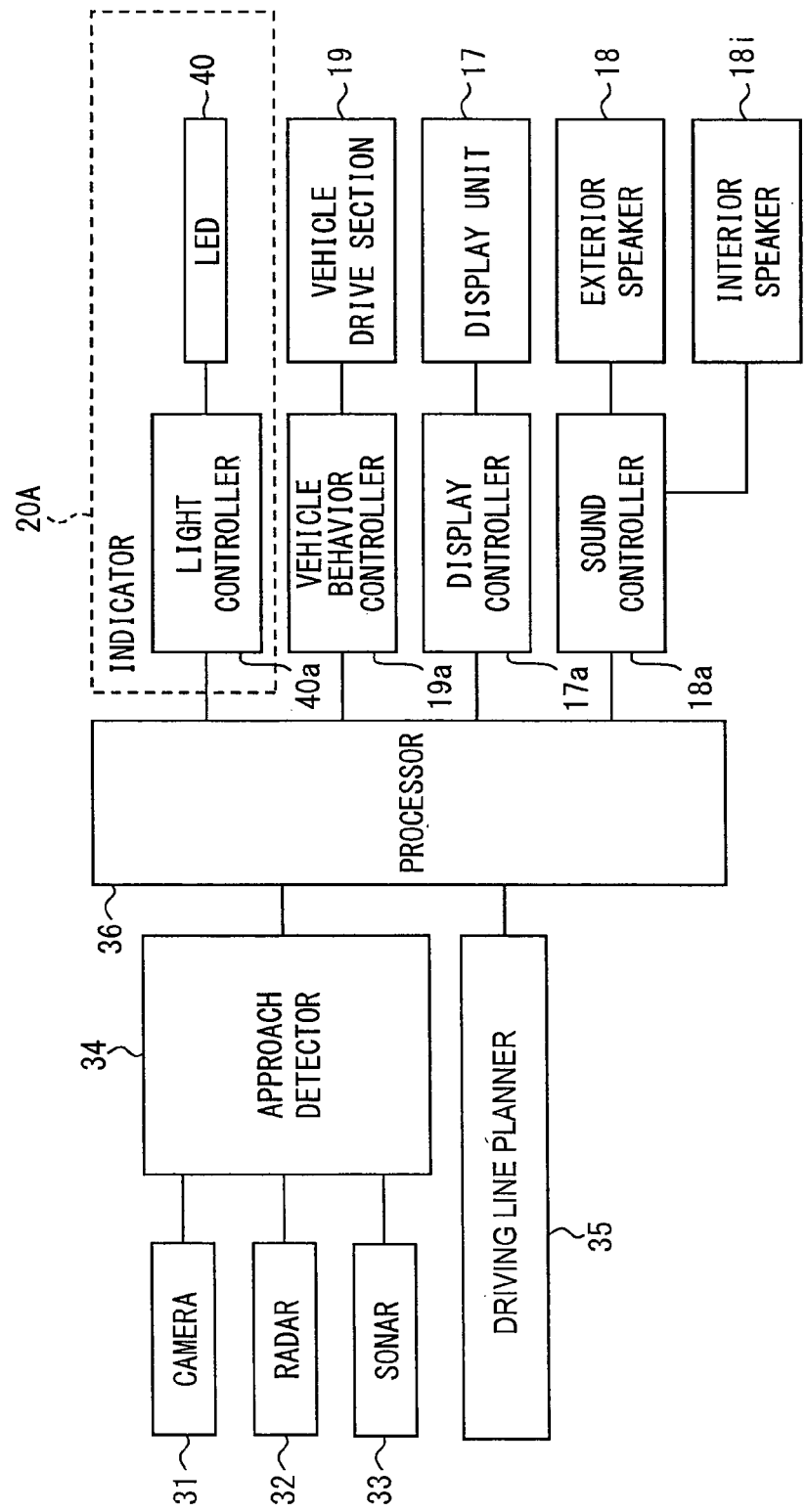
FIG. 15 is a block diagram of an indicator according to the fifth embodiment.

In the first embodiment, the vehicle-mounted apparatus according to the first embodiment includes the movable device 20 capable of performing the pan action. In contrast, as shown in FIG. 15, a vehicle-mounted apparatus according to a fifth embodiment includes an indicator 20A instead of the movable device 20. The indicator 20A does not have the pan motor 23, the tilt motor 24, and the motor controller 23a.

Figure 12:
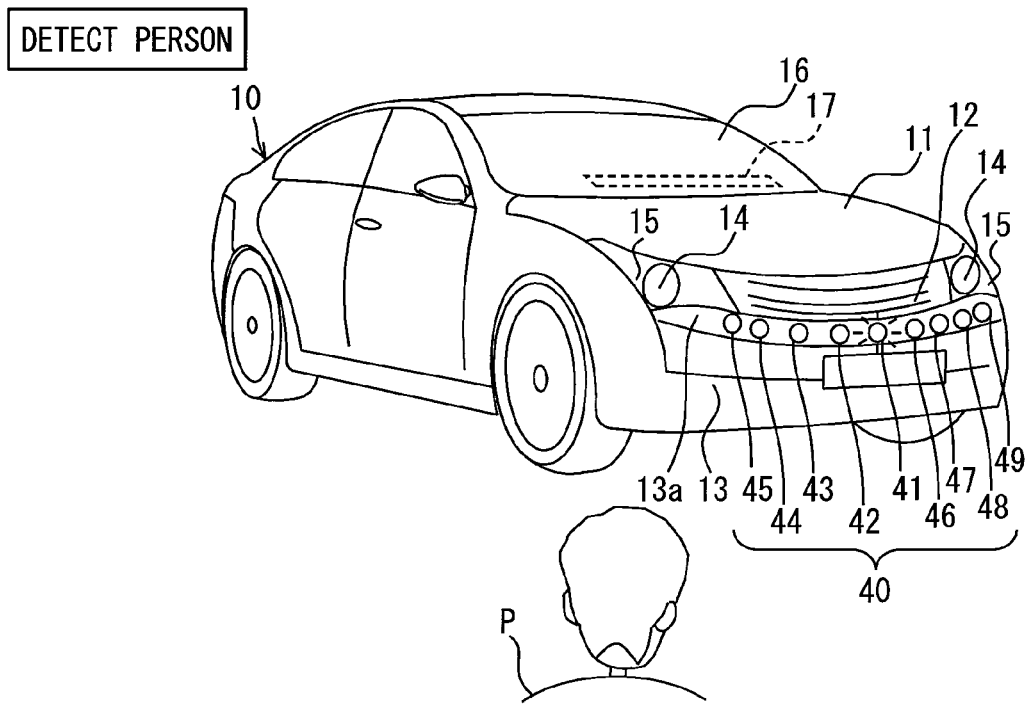
FIG. 12 is a perspective view showing an operation state of an indicator according to a fifth embodiment of the present disclosure observed when a person is detected.

The indicator 20A has an indication section 40. As shown in FIG. 12, the indication section 40 is mounted on the vehicle 10 so that the person P around the vehicle 10 can see the indication section 40. In the indication section 40, a specific light emitter shines in a predetermined manner so that the person P can see the light emitter moving in the lateral direction. Specifically, the indication section 40 includes multiple LEDs 41, 42, 43, 44, 45, 46, 47, 48, and 49 as light sources. These LEDs 41-49 are arranged side by side in the lateral direction at the front portion of the vehicle 10. In an example shown in FIG. 12, the indication section 40 is mounted below the headlights 14 and the front grille 12. Specifically, the bumper 13 has a top surface 13a directed upward in the height direction, and the indication section 40 is mounted on the top surface 13a.

As shown in FIG. 15, like in the first embodiment, the vehicle 10 according o the fifth embodiment is equipped with the camera 31, the radar device 32, the sonar device 33, the approach detector 34, and the driving line planner 35. Further, the vehicle 10 is equipped with the display unit 17, the exterior speaker 18, the interior speaker 18i, the vehicle drive unit 19, the display controller 17a, the sound controller 18a, and the vehicle behavior controller 19a. Like in the first embodiment, the processor 36 determines whether the possibility of collision between the approaching person and the vehicle 10 is equal to or greater than the predetermined percentage. If the processor 36 determines that the collision possibility is equal to or greater than the predetermined percentage, the processor 36 outputs command signals to the display controller 17a, the sound controller 18a, and the vehicle behavior controller 19a based on a positional relationship between the vehicle 10 and the approaching person.

Figure 13:
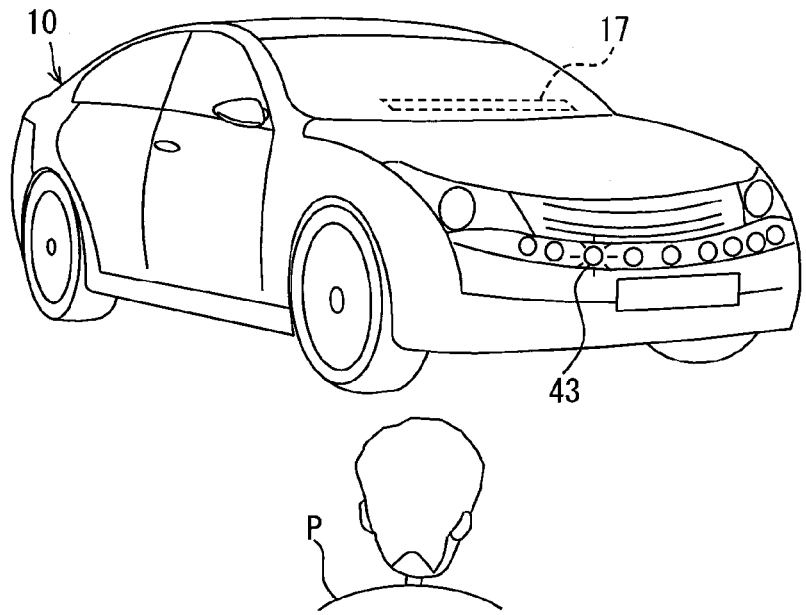
FIG. 13 is a perspective view showing an operation state of the indicator according to the fifth embodiment observed when a specific light emitter moves.
Figure 14:
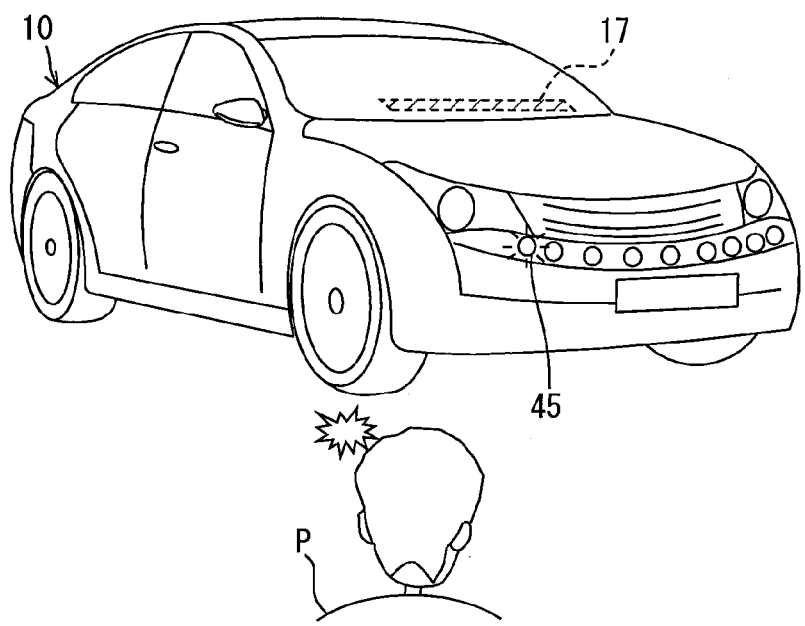
FIG. 14 is a perspective view showing an operation state of the indicator according to the fifth embodiment observed when the specific light emitter stops moving.

The indicator 20A includes a light controller 40a for driving and controlling the LEDs 41-49. The processor 36 outputs a command signal to the light controller 40a based on where there is an approaching person and based on a positional relationship between the approaching person and the vehicle 10. In accordance with the command signal, the light controller 40a controls a content of indication of the indication section 40 as shown in FIGS. 12, 13, and 14.

Figure 16:
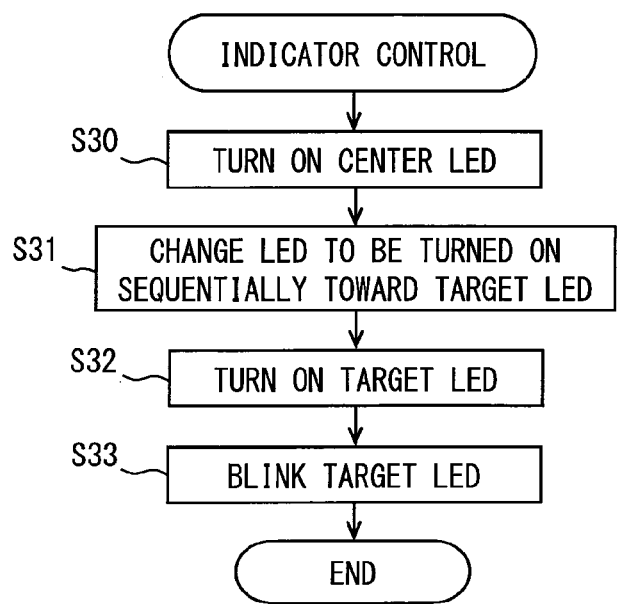
FIG. 16 is a flowchart of an indicator control process according to the fifth embodiment.

The indicator 20A is controlled according to an indicator control process shown in FIG. 16. The indicator control process shown in FIG. 16 replaces the movable device control process performed at S16 in FIG. 4. Therefore, the indictor control process shown in FIG. 16 is performed when it is determined at S11 in FIG. 4 that there is an approaching person, and it is determined at S14 in FIG. 4 that the collision possibility is equal to or greater than the predetermined percentage.

At S30 in FIG. 16, the LED 41 (hereinafter sometimes referred to as the "center LED"), which is located in the center of the arrangement of the LEDs 41-49 arranged in the lateral direction of the vehicle 10, is turned ON so that the LED 41 can shine steadily. For example, as shown in FIG. 12, when an approaching person P ahead of the vehicle 10 on the right is detected, and the collision possibility is equal to or greater than the predetermined percentage, the center LED 41 is turned ON so that the center LED can shine steadily. Then, at S31, the indication section 40 is controlled so that the LED to be turned ON can be changed sequentially toward the LED 45 (hereinafter sometimes referred to as the "target LED") which is located in an indication portion closer to the approaching person P than any other LED.

Specifically, after the center LED shines for a predetermined period of time, the center LED is turned OFF while the LED 42, which is located next to the center LED on the target LED side, is turned ON so that the LED 42 can shine steadily. Then, after the LED 42 shines for a predetermined period of time, the LED 42 is turned OFF while the LED 43, which is located next to the LED 42 on the target LED side, is turned ON so that the LED 43 can shine steadily as shown in FIG. 13. In this way, the LED 43, the LED 44, and the LED 45 are turned ON in turn. Thus, the indication section 40 is controlled so that the specific light emitter can be sequentially changed in the following order: the center LED, the LED 42, the LED 43, the LED 44, and the LED 45.

When the specific light emitter is changed to the target LED, the target LED shines for a predetermined period of time at S32. Then, at S33, the target LED is caused to blink.

As described above, according to the fifth embodiment, the indication of the indication section 40 is changed based on the detection results of the camera 31, the radar device 32, and the sonar device 33. Specifically, a specific region (i.e., specific light emitter) of an indication area of the indication section 40 shines in a manner different from a manner in which the remaining region of the indication area of the indication section 40 shines. The specific light emitter moves inside the indication area and stops moving at the indication portion (i.e., target LED) on the near side to the approaching person. Thus, the approaching person on the side where the specific light emitter stops moving notices that the vehicle 10 is already aware of the approaching person. Therefore, a feeling of insecurity, such as not knowing whether or not the vehicle 10 is aware of the approaching person, given to the approaching person can be reduced.

Further, according to the fifth embodiment, the light controller 40a controls the indication section 40 so that when the specific light emitter stops moving, the specific light emitter is driven in a different manner than when the specific light emitter moves. Specifically, when the specific light emitter moves, the specific light emitter shines steadily, and the others are kept OFF. Then, when the specific light emitter stops moving, the specific light emitter is caused to blink. Thus, from the approaching person perspective, an optical axis of the specific light emitter of the indicator 20A is approaching the approaching person. Then, when the specific light emitter stops moving after the optical axis become sufficiently close to the approaching person, the shining specific light emitter is caused to blink. Therefore, the approaching person more surely notices that the vehicle 10 is already aware of the approaching person. Accordingly, the feeling of insecurity given to the approaching person can be more surely reduced.

Further, according to the fifth embodiment, the exterior speaker 18 and the display unit 17 start notification of information to the approaching person when the specific light emitter of the indicator 20A stops moving or when a predetermined period of time elapses after the specific light emitter stops moving. Thus, from the approaching person perspective, the notification is started after the specific light emitter moves toward the approaching person and stops at a position sufficiently close to the approaching person. Thus, since the approaching person can feel that the notification is given to the approaching person, communication between the approaching person and the vehicle 10 can be promoted. Specifically, the approaching person easily know that the notification given to the approaching person indicates whether the vehicle 10 gives the right of way to the approaching person or the vehicle 10 would like the approaching person to give the right of way to the vehicle 10.

Sixth Embodiment

Figure 17:
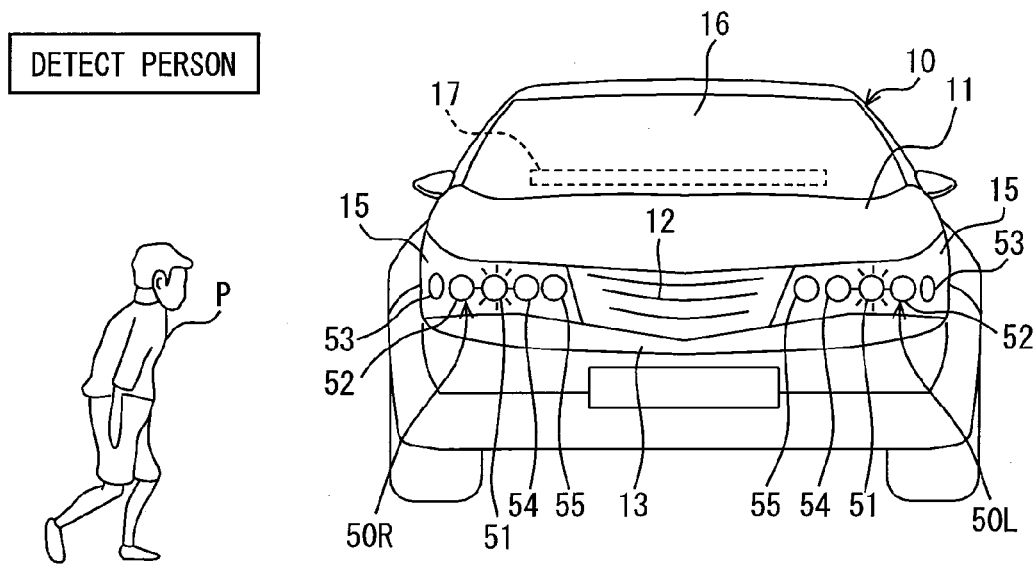
FIG. 17 is a perspective view showing an operation state of an indicator according to a sixth embodiment of the present disclosure observed when a person is detected.

As shown in FIG. 17, according to a sixth embodiment, the indicator 20A has two indication sections 50R and 50L which are spaced from each other by a predetermined distance in the lateral direction. Each of the indication sections 50R and 50L has multiple LEDs 51, 52, 53, 54, and 55 as light sources. These LEDs 51-55 are arranged side by side in the lateral direction at the front portion of the vehicle 10. In an example shown in FIG. 17, the indication sections 50R and 50L are separately mounted inside the outer covers 15 and serve as the headlights 14 for illuminating the area ahead of the vehicle 10. A vehicle-mounted apparatus according to a sixth embodiment is the same as the vehicle-mounted apparatus according to the fifth embodiment except for the indication sections 50R and 50L.

Figure 18:
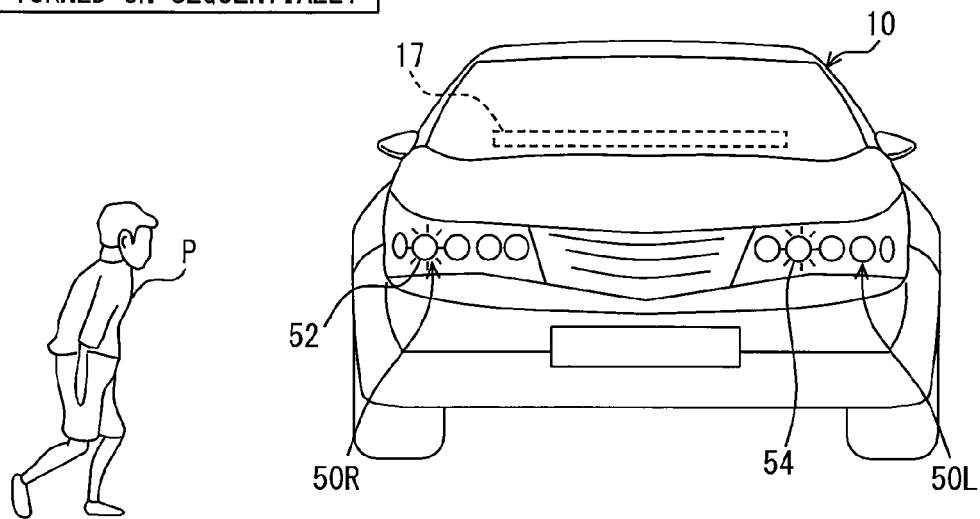
FIG. 18 is a perspective view showing an operation state of the indicator according to the sixth embodiment observed when a specific light emitter moves.
Figure 19:
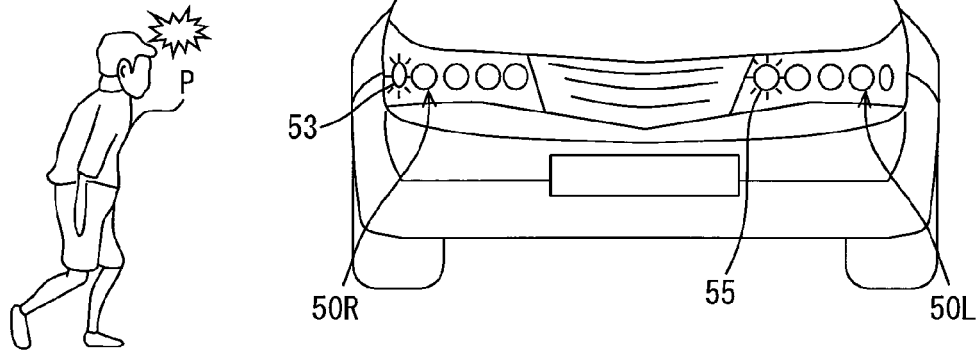
FIG. 19 is a perspective view showing an operation state of the indicator according to the sixth embodiment observed when the specific light emitter stops moving.

For example, as shown in FIG. 17, when an approaching person P ahead of the vehicle 10 on the right is detected, and the collision possibility is equal to or greater than the predetermined percentage, the LED 51 (hereinafter sometimes referred to as the "center LED"), which is located in the center of the arrangement of the LEDs 51-55 arranged in the lateral direction of the vehicle 10, of each of the indication sections 50R and 50L is turned ON so that the LED 51 can shine steadily. Then, as shown in FIGS. 18 and 19, the indication sections 50R and 50L are controlled so that the LEDs to be turned ON in the indication sections 50R and 50L can be changed sequentially toward the LEDs 53 and 55 (hereinafter sometimes referred to as the "target LED") which are located in indication portions closer to the approaching person P than any other LED. In the case of the indication section 50R on the right side of the vehicle 10, the target LED is the LED 53 which is located at the right end of an indication area of the indication section 50R. In the case of the indication section 50L on the left side of the vehicle 10, the target LED is the LED 55 which is located at the right end of an indication area of the indication section 50L. Like in the fifth embodiment, when the specific light emitter is changed to the target LED, the target LED shines for a predetermined period of time. Then, the target LED is caused to blink.

When there is a need to turn ON the headlights 14, for example, at nighttime, all the LEDs 51-55 are turned ON. In this case, the intensity of the specific light emitter is set greater than the intensity of any other light emitter so that the specific light emitter can shine in a manner different from a manner in which the other light emitters shine. Like in the fifth embodiment, the exterior speaker 18 and the display unit 17 start notification of information to the approaching person when the specific light emitter stops moving or when a predetermined period of time elapses after the specific light emitter stops moving.

As described above, according to the sixth embodiment, the specific light emitter moves inside the indication area of each of the indication sections 50R and 50L and stops moving at the indication portion (i.e., target LED) on the near side to the approaching person. Thus, the approaching person on the side where the specific light emitter stops moving notices that the vehicle 10 is already aware of the approaching person. Therefore, the same effect and advantage as obtained in the fifth embodiment can be obtained.

Further, according to the sixth embodiment, the two indication sections 50R and 50L are spaced from each other by a predetermined distance in the horizon direction. Thus, the indication sections 50R and 50L give an impression of being a pair of eyes of an animal to the approaching person who sees the approaching specific light emitters. Therefore, the approaching person surely notices that the vehicle 10 is already aware of the approaching person. Accordingly, the feeling of insecurity given to the approaching person can be surely reduced.

Further, according to the sixth embodiment, the LEDs 51-55 are also used as the headlights 14, the number of parts in the vehicle-mounted apparatus can be reduced.

Seventh Embodiment

Figure 20:
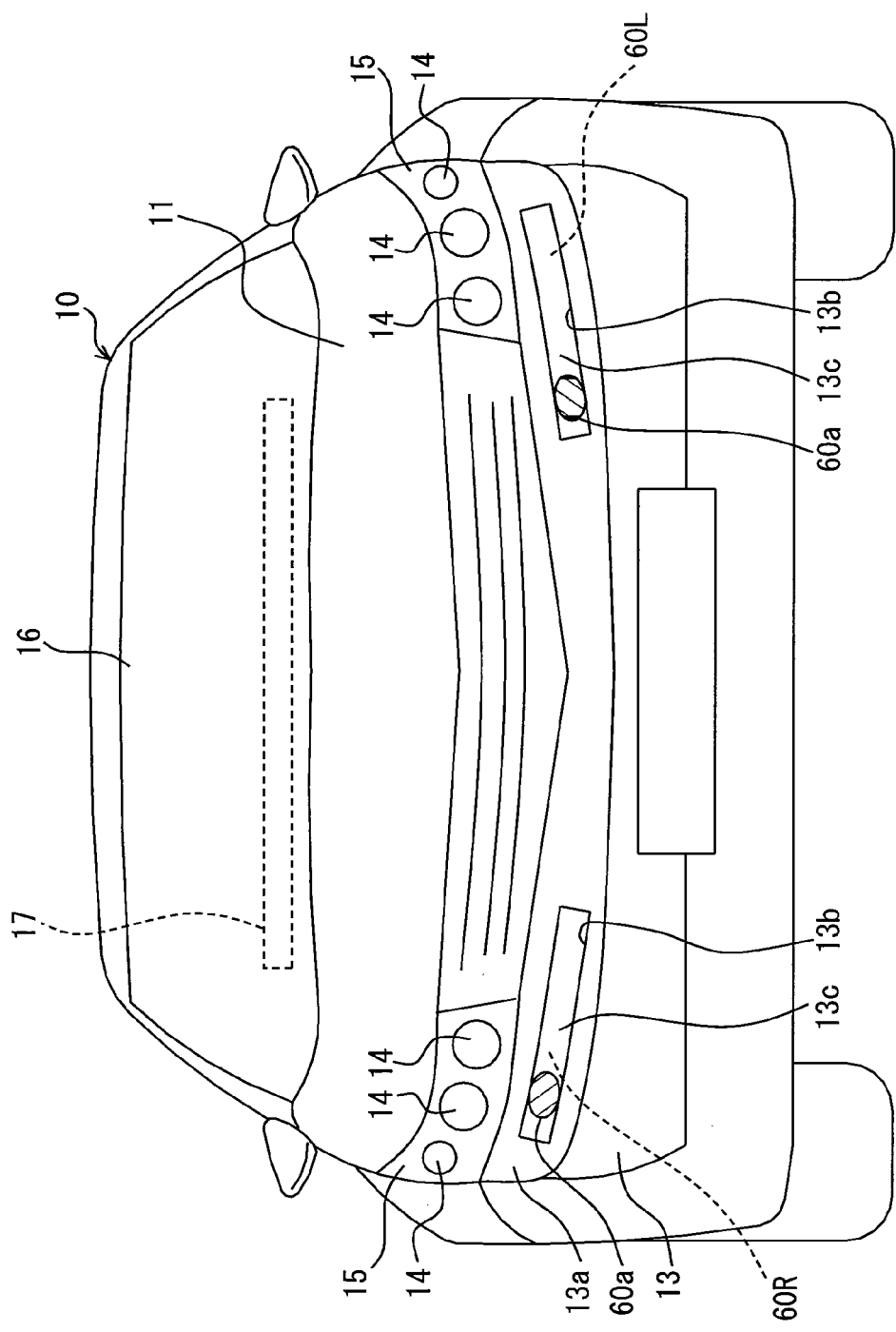
FIG. 20 is a front view illustrating where an indicator of a vehicle-mounted apparatus according to a seventh embodiment of the present disclosure is mounted on a vehicle.

In the sixth embodiment, the light sources of the indication sections 50R and 50L are also used as headlights. In contrast, as shown in FIG. 20, according to a seventh embodiment, light sources of indication sections 60R and 60L are provided separately from the headlights 14. Specifically, the indication sections 60R and 60L are mounted on the top surface 13a of the bumper 13. As mentioned previously, the top surface 13a is directed upward in the height direction. Like in the sixth embodiment, the indication sections 60R and 60L are spaced from each other by a predetermined distance in the lateral direction.

Figure 21:
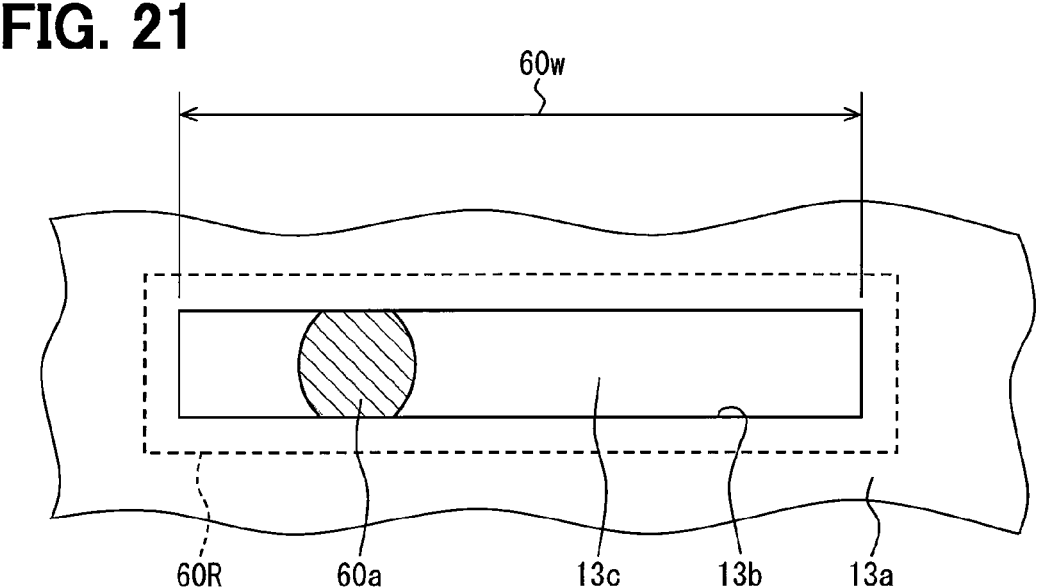
FIG. 21 is a partial enlarged view of FIG. 20.

Further, as shown in FIG. 21, the indication sections 60R and 60L are provided by a liquid-crystal display (LCD) panel. Specifically, slits 13b are formed on the top surface 13a, and the LCD panel is placed under the top surface 13a so an outer region of the LCD panel can be covered and hided by the top surface 13a. Further, specific light emitters 60a imitating human eyes are displayed on the LCD panel in such a manner that the specific light emitters 60a move inside the slits 13b in the lateral direction of the vehicle 10. Thus, a person can feel that human eyes move inside the slits 13b in the lateral direction of the vehicle 10.

For example, when an approaching person P ahead of the vehicle 10 on the right is detected, and the collision possibility is equal to or greater than the predetermined percentage, the specific light emitter 60a is displaced in the center of the slit 13b of each of the indication sections 60R and 60L. Then, the indication sections 60R and 60L are controlled so that the approaching person P can see the specific light emitter 60a gradually moving toward a side where the approaching person is. Like in the sixth embodiment, when the specific light emitter 60a reaches a target position, the specific light emitter 60a is caused to blink.

As described above, according to the seventh embodiment, the specific light emitter 60a moves inside the indication area of each of the indication sections 60R and 60L and stops moving at the indication portion (i.e., target position) on the near side to the approaching person. Thus, the approaching person on the side where the specific light emitter 60a stops moving notices that the vehicle 10 is already aware of the approaching person. Therefore, the same effect and advantage as obtained in the sixth embodiment can be obtained.

Further, according to the seventh embodiment, since the indication sections 60R and 60L are provided by the LCD panel, the specific light emitters 60a can be displayed in the indication sections 60R and 60L so that the specific light emitters 60a can move smoothly. Thus, thus, the indication sections 60R and 60L give a strong impression of being a pair of eyes of an animal to the approaching person who sees the approaching specific light emitters 60a. In particular, according to the seventh embodiment, a length 60w of the slit 13b in the lateral direction is greater than a length of the slit 13b in the height direction. Thus, since each specific light emitter 60a moves inside the indication area extending in the lateral direction of the vehicle, the indication sections 60R and 60L give a much strong impression of being a pair of eyes of an animal to the approaching person who sees the approaching specific light emitters 60a.

(Modifications)

While the present disclosure has been described with reference to the embodiments, it is to be understood that the disclosure is not limited to the embodiments. The present disclosure is intended to cover various modifications and equivalent arrangements inside the spirit and scope of the present disclosure. For example, the embodiments can be modified as follows.

In the above embodiments, the movable device 20 rotates toward a pedestrian, and the specific light emitters 41, 51, 61, and 70a stop moving at the indication portion on the near side to the pedestrian. Alternatively, the movable device 20 can rotate toward a person other than a pedestrian, such as a driver of a bicycle or a vehicle, around the vehicle 10, and the specific light emitters 41, 51, 61, and 70a can stop moving at the indication portion on the near side to such a person.

In the first embodiment shown in FIG. 1, the movable device 20 is placed inside the outer cover 15 which covers the headlight 14. Alternatively, the movable device 20 can be placed outside the outer cover 15. For example, the movable device 20 can be mounted to the front grille 12 or the bumper 13. Further, the number of the movable devices 20 is not limited two. For example, the number of the movable devices 20 can be one. The vehicle-mounted apparatus according to the present disclosure can be applied to a vehicle which is not equipped with the automatic driving function.

The control of rotating the movable device 20 toward the person, and the control of moving and stopping the specific light emitter can be prohibited in specific cases. For example, the controls can be allowed when a traveling speed of the vehicle 10 is lower than a threshold speed and prohibited when the traveling speed of the vehicle 10 is not lower than the threshold speed. For example, when there are too many people around the vehicle 10 to identity a person to whom a notification is given, the controls can be prohibited.

In the first embodiment shown in FIG. 1, the movable device 20 can perform the pan action and the tilt action toward either a face of the person or a lower body of the person. In the embodiments, the LED 25 is caused to blink at the same time when the pan action and the tilt action are completed. Alternatively, the LED 25 can be caused to blink when a predetermined period of time (e.g., half a second) elapses after the pan action and the tilt action are completed.

In the embodiments, the camera 31, the radar device 32, and the sonar device 33 are used for the detection. Alternatively, the detection can be achieved without using at least one of the radar device 32 and the sonar device 33.

After the control of rotating the movable device 20 toward the person, and the control of moving and stopping the specific light emitter are performed, the LED and the specific light emitter can be caused to blink while or after their intensities are increased by combining the first and second embodiments.

In the embodiments shown in FIGS. 12, 13, and 14, the LEDs 41-49 can be covered with a black cover so that light emitted from the LEDs 41-49 can be seen by a person outside the vehicle 10, but the LEDs 41-49 themselves cannot be viewed by the person. In the embodiments shown in FIGS. 17, 18, and 19, when all the LEDs 51-55 are turned ON so that they can serve to provide night-time illumination, the intensity of the specific light emitter can be set greater than the intensity of any other LED so that the specific light emitter can shine in a manner different from a manner in which the other light emitters shine. Alternatively, only the specific light emitter can be caused to blink so that the specific light emitter can shine in a manner different from a manner in which the other light emitters shine.

In the first embodiment, the movable device 20 is capable of rotating around both the imaginary line K1 extending in the height direction and the imaginary line K2 extending in the lateral direction. That is, the movable device 20 can perform both the pan action and the tilt action. It is not always necessary that the movable device 20 performs the tilt action.

Such changes and modifications are to be understood as being inside the scope of the present disclosure as defined by the appended claims.

What is claimed is:

1. An apparatus mountable on a vehicle comprising:
at least one movable device mountable on the vehicle so that a person around the vehicle sees the at least one movable device, each of the at least one movable device having light emitters and rotating around an imaginary line extending in a height direction of the vehicle;
a sensor configured to detect a positional relationship between the vehicle and the person, and
a drive controller configured to rotate the at least one movable device toward the person based on the positional relationship detected by the sensor, wherein,
in each of the at least one movable device:
at least one of the light emitters is shining before the drive controller rotates the at least one movable device toward the person,
a number of the light emitters shining steadily is increased after the drive controller rotates the at least one movable device toward the person, and
the light emitters steadily shining start to blink when a predetermined time has elapsed from completion of the rotation of the at least one movable device.

2. The apparatus according to claim 1, wherein
the drive controller rotates the at least one movable device toward the person with at least one of the light emitters shining steadily.

3. The apparatus according to claim 1, further comprising
two movable devices including the at least one movable device, wherein
the two movable devices are spaced from each other by a predetermined distance in a lateral direction of the vehicle.

4. The apparatus according to claim 1, wherein
the drive controller rotates the at least one movable device toward the person by directing an optical axis of the light emitters toward the person.

5. The apparatus according to claim 1, further comprising:
a light controller configured to drive the light emitters so that the light emitters shine differently between when the at least one movable device rotates and when the at least one movable device stops rotating.

6. The apparatus according to claim 1, further comprising:
a notification device mounted on the vehicle and notifying the person of information, wherein
the notification device starts notifying the person of the information when the at least one movable device stops rotating or when a predetermined period of time elapses after the at least one movable device stops rotating.

7. The apparatus according to claim 1, wherein
the at least one movable device is capable of rotating around an imaginary line extending in a lateral direction of the vehicle.

8. The apparatus according to claim 1, wherein
the drive controller rotates the at least one movable device toward the person when a traveling speed of the vehicle is lower than a threshold speed, and
the drive controller is prohibited to rotate the at least one movable device toward the person when the traveling speed of the vehicle is higher than or equal to the threshold speed.

9. An apparatus mountable on a vehicle comprising:
at least one indicator mountable on the vehicle so that a person around the vehicle sees the at least one indicator, the at least one indicator configured to display a specific light emitter shining in a predetermined manner so that the person sees the specific light emitter moving in a lateral direction of the vehicle;
a sensor configured to detect a positional relationship between the vehicle and the person, and
a controller configured to control the at least one indicator so that the specific light emitter stops moving at a position on a near side to the person, wherein
each of the at least one indicator includes more than three light sources arranged in the lateral direction, and
the controller controls the more than three light sources in each of the at least one indicator to be turned on or off sequentially in the lateral direction so that the person sees the specific light emitter moving in the lateral direction of the vehicle.

10. The apparatus according to claim 9, further comprising
two indicators including the at least one indicator, wherein
the indicators are spaced from each other by a predetermined distance in the lateral direction of the vehicle.

11. The apparatus according to claim 9, wherein
the controller controls the indicator so that the specific light emitter shines differently between when the specific light emitter moves and when the specific light emitter stops moving.

12. The apparatus according to claim 9, further comprising:
a notification device mounted on the vehicle and notifying the person of information, wherein
the notification device starts notifying the person of the information when the specific light emitter stops moving or when a predetermined period of time elapses after the specific light emitter stops moving.

13. The apparatus according to claim 9, wherein
the controller controls the at least one indicator so that the specific light emitter stops moving at the position on the near side to the person, when a traveling speed of the vehicle is lower than a threshold speed, and
the drive controller is prohibited to control the at least one indicator so that the specific light emitter stops moving at the position on the near side to the person, when the traveling speed of the vehicle is higher than or equal to the threshold speed.

14. An apparatus mountable on a vehicle comprising:
at least one movable device mountable on the vehicle so that a person around the vehicle sees the at least one movable device, each of the at least one movable device having light emitters and rotating around an imaginary line extending in a height direction of the vehicle;
a sensor configured to detect a positional relationship between the vehicle and the person, and a drive controller configured to rotate the at least one movable device toward the person based on the positional relationship detected by the sensor, wherein:

in each of the at least one movable device:
- at least one of the light emitters is shining before the drive controller rotates the at least one movable device toward the person, and
- a number of the light emitters shining steadily is increased after the drive controller rotates the at least one movable device toward the person;

the drive controller rotates the at least one movable device toward the person when a traveling speed of the vehicle is lower than a threshold speed; and the drive controller is prohibited to rotate the at least one movable device toward the person when the traveling speed of the vehicle is higher than or equal to the threshold speed.

15. An apparatus mountable on a vehicle comprising:

at least one indicator mountable on the vehicle so that a person around the vehicle sees the at least one indicator, the at least one indicator configured to display a specific light emitter shining in a predetermined manner so that the person sees the specific light emitter moving in a lateral direction of the vehicle;

a sensor configured to detect a positional relationship between the vehicle and the person, and a controller configured to control the at least one indicator so that the specific light emitter stops moving at a position on a near side to the person, wherein:

each of the at least one indicator includes a plurality of light sources arranged in the lateral direction, the controller controls the plurality of light sources in each of the at least one indicator to be turned on or off sequentially in the lateral direction so that the person sees the specific light emitter moving in the lateral direction of the vehicle, the controller controls the at least one indicator so that the specific light emitter stops moving at the position on the near side to the person, when a traveling speed of the vehicle is lower than a threshold speed, and the drive controller is prohibited to control the at least one indicator so that the specific light emitter stops moving at the position on the near side to the person, when the traveling speed of the vehicle is higher than or equal to the threshold speed.

* * * * *